3,275,504
METHOD FOR CONTROLLING MICROBIOLOGICAL ORGANISMS WITH COMPOSITIONS COMPRISING HALOGENATED LEVULINIC ACID AND DERIVATIVES
Robert J. Herschler, Camas, Wash., assignor to Crown Zellerbach Corporation, San Francisco, Calif., a corporation of Nevada
No Drawing. Filed Nov. 23, 1964, Ser. No. 413,356
9 Claims. (Cl. 167—22)

This is a continuation-in-part of my copending application Serial No. 135,709, filed August 24, 1961, now abandoned.

This invention relates to methods and compositions for controlling the growth and propagation of microbiological organisms including algae, bacteria, yeasts, and fungi.

The general object of the present invention is the provision of versatile biocidal compositions and methods of their application, which compositions are active against a wide spectrum of microorganisms including algae, bacteria, yeasts and fungi and which, in addition, are:

(a) Effective at low concentrations;
(b) Effective in both liquid and solid substrates;
(c) More efficient on a weight for weight basis than the standard commercial biocides;
(d) Versatile in their application in that they may be used in the vapor, liquid or solid state;
(e) Pleasant in their physical form, many being heavy, light-colored, pleasantly-scented oils;
(f) Readily compatible with a variety of available liquid and solid vehicles.

The chemical agents which I have discovered to possess the foregoing desirable attributes comprise in general the halogenated levulinic acids, the salts thereof, the esters thereof, and the amides thereof.

Specific halogenated acids which are suitable in this invention include those having the formula:

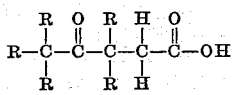

where R is either chlorine, bromine or hydrogen and one occurrence of R, and as many as four occurrences of R, are either bromine and/or chlorine.

The salts of the halogenated levulinic acids which are suitable for the present purpose comprise in general the alkali metal salts, the alkaline earth metal salts, the ammonium salts, the heavy meta salts and the amine salts. Exemplary of the heavy metal salts are the lead, copper, zinc, nickel, cadmium, chromium and mercury salts. Exemplary of the alkali and alkaline earth metal salts are the sodium, potassium, calcium, magnesium, strontium and barium salts. Exemplary of the amine salts are primary methyl amine, dimethyl amine, primary ethyl amine and diethyl amine.

Illustrative of the ester derivatives of the halogenated levulinic acids which may be applied in the present invention are the methyl, ethyl, propyl and higher aliphatic and/or aromatic esters such as hexyl, octyl, decyl and phenyl.

Illustrative of suitable amide derivatives are the N methyl, N,N dimethyl, N ethyl, N,N diethyl and N phenyl amides. For example, N,N-dimethyldichlorolevulinamide and N-phenyldichlorolevulinamide.

Especially suitable for use in the present invention are the chlorinated levulinic acids, particularly 3,3,5-trichlorolevulinic acid, 3,5,5-trichlorolevulinic acid, 3,3,5,5-tetrachlorolevulinic acid and 3,5-dichlorolevulinic acid, as well as their lower alkyl esters.

The foregoing biocidal agents may be used singly or in combination with each other and with various liquid or solid vehicles.

In applications where a fugitive biocide is desired, a halogenated levulinic acid or levulinic acid derivative such as ethyl 3-chlorolevulinate may be employed as a fumigating vapor. In other applications, however, the halogenated levulinic acid or levulinic acid derivative may be incorporated in an amount of, for example, from 0.1–10% by weight in a suitable liquid or solid vehicle.

Suitable liquid vehicles comprise those organic or aqueous liquids in which the biocidal component may be dissolved or with which it may be emulsified. Illustrative for this purpose comprise water and the lower aliphatic alcohols such as methanol, ethanol, and isopropanol.

Suitable solid vehicles with which the biocidal agent may be compounded comprise those inert materials which lend themselves to the compounding of powders and dusts including diatomaceous earth, talc, bark powder, wood flour and the like.

The herein described biocidal materials have many important applications including, for example, their uses as industrial and household germicides, as wood preservatives, as soil fumigants, as rot proofing agents for fabrics and as slime preventatives for use in papermill pulp slurries.

Where they are to be used as household or industrial disinfectants they may be used as fumigants is inclosed spaces by vaporizing from 1 to 100 parts per million of the biocidal material and maintaining the area enclosed until the toxic action of the material has been completed. In the alternative, the biocidal material may be dissolved in a suitable organic solvent, or emulsified with water to provide a liquid disinfecting agent which may be applied to the surfaces to be disinfected in the usual manner. Again, a concentration of 5 to 400 parts per million is effective in destroying the microorganisms with which the agent comes in contact.

Where the biocidal agent is to be employed as a wood preservative, it may first be dissolved in a lower aliphatic alcohol or other suitable organic liquid vehicle to form a solution having a concentration of from 0.1–10% by weight of biocide. This then is applied to the wood by brushing it on, with or without preliminary incising of the wood surface, or by conventional pressure treatment.

Where the biocidal material is to be used for soil fumigation, it may be introduced at spaced intervals into the soil per se or mixed with a suitable carrier, using an application of 30 to 350 pounds per acre. Volatilization of the biocide disperses it effectively throughout the soil, killing the microorganisms with which it comes in contact.

Where the biocide is to be employed at a rot proofing compound for application to cotton and other fabrics subject to fungal attack, the cloth may be impregnated with a solution of the biocide in a lower aliphatic alcohol or other liquid vehicle by immersion or spraying, using an application of from 0.25% to 5%, by weight, biocide basis.

Where the biocidal agent is to be employed to prevent slime formation in papermaking pulp slurries, from 5 to 400 parts per million of the agent in the form of an alcohol solution, or as an aqueous emulsion, are mixed with the pulp, preferably in the beater where it effectively prevents the formation of slime and thereby insures improved paper quality. The biocidal agent may be added down stream from the beater, say, at the fan pump (after the pulp slurry has been diluted some tenfold from the concentration at the beater). Addition at this point to a concentration af around .5 p.p.m. may give satisfactory control.

The compositions of the invention and their application are illustrated in the following examples:

Example 1.—Fungicidal

Sabourauds dextrose agar plates were prepared containing 0.25–5% by weight 3,5-dichlorolevulinic acid. These plates were inoculated with a mixture of the spores of Aspergillus, Penicillium, and Mucor.

After 14 days there was no evidence of growth in any of the plates. Control plates containing no dichlorolevulinic acid showed abundant growth.

Example 2.—Fungicidal

Sabourauds dextrose agar plates were prepared and inoculated with a mixture of the spores of Aspergillus, Penicillium and Mucor.

A small crucible was pressed into the agar of each plate and a few drops of ethyl 3-chlorolevulinate and octyl 3-chlorolevulinate were placed separately in each crucible.

After 7 days it was observed that the vapors of the halogenated ketone esters prevented spore germination and mold growth. Growth of mold in control plates, was prolific.

Example 3.—Biocidal

A starch paste was prepared. One portion was retained as a control. A second portion was treated with 1% ethyl 3,5-dichlorolevulinate. A third portion was treated with 1% 3,3,5-trichlorolevulinic acid.

All of the samples were stored in unsterile jars with screw cap closures where they were exposed to inoculation by the usual airborne microorganisms.

At the end of three weeks' storage at room temperature, the control showed decomposition as noted by the evolution of odor and the presence of black and rose colored microorganism colonies on the paste surface.

The samples treated with the halogenated keto ester and halogenated keto acid showed no evidence of decomposition after the same period of time.

Example 4.—Algaecidal

Samples of algae (Chlorella) were cultivated in an inorganic nutrient medium using fluorescent light illumination in the incubator. Part of the samples were retained untreated as controls. Others were treated separately with 25 parts per million of 3 mono-, 3,5-di- and 3,5,5-trichlorolevulinic acid, and the ethyl esters of 3 mono- and 3,5-dichlorolevulinic acid.

During the 2nd and 4th week each of the samples was reinoculated with a fresh algae culture. After a total period of six weeks at ambient temperature, the control samples had grown prolifically, covering the flask walls with a green scum. However, all of the samples treated with the halogenated keto acids or esters remained free of algae growth.

Example 5.—Bactericidal

A mixed Staphylococcus culture was dispersed in isotonic saline solution and placed in three sterile containers, each containing an equal portion of the dispersion. One of the containers was held as a control, the second was treated with 1% by weight of liquid trichlorolevulinic acid (predominately 3,3,5-isomer with a minor amount of 3,5,5-trichlorolevulinic acid), the third was treated with 1% by weight of liquid ethyl 3-monochlorolevulinate. The contents of each container then was streaked on nutrient agar plates.

The streaks on the agar plate from the control developed heavy Staph. contamination after 36 hours. The streaks on the agar plates from the containers containing trichlorolevulinic acid and ethyl monochlorolevulinate showed no viable organisms after a two-hour contact time at 20° C.

Example 6.—Fungicidal

1% by weight of 3,3,5-trichlorolevulinic acid was mixed with sodium stearate which then was pressed into a cake. Portions of the cake cut into discs were placed on the surface of agar plates inoculated with viable mold spores. After 14 days the areas beneath and around the treated sodium stearate discs still were free of mold growth.

Example 7.—Slime control

A papermaking, slime-organism-contaminated, groundwood pulp slurry at 1% consistency was treated, in separate portions, with 200 parts per million 3,5-dichlorolevulinic acid, 3,3,5-trichlorolevulinic acid, and ethyl 3-chlorolevulinate by adding each as a 20% solution in ethyl alcohol, which solution was prepared immediately before the test.

After 24 and 48 hours' contact, respectively, between the pulp slurry and experimental biocide, at 20° C., two portions were pipetted out of each sample, plated in a nutrient agar, compared with untreated pulp of the same batch as to slime organism count. All of the biocides tested reduced the slime organism count by at least 97%.

Where an alcohol is used as a water dispersant for halogenated levulinic acid, the alcohol should be added to the acid within a short time before the addition to a water system due to the short shelf life of this mixture. Dimethyl sulfoxide may also be used as a dispersant although it is not as satisfactory commercially because higher dosages must be employed to obtain an adequate dispersed level of the halogenated levulinic acid in the water. For a unique and particularly advantageous dispersant composition see my copending application Serial No. 413,364, filed November 23, 1964.

Example 8.—Algaecide 10 pounds of 3,3,5-trichlorolevulinic acid may be combined with a stoichiometric amount of cupric chloride (approximately 3 pounds) in a reaction solvent (and carrier for the resulting product) in 10 pounds of dimethyl sulfoxide. The resulting product may be formulated further by addition thereto of 20 pounds of a 50% solid water solution of concentrated ammonia based sulfite waste liquor (approximately 60% ammonium lignosulfonate) with stirring. The cupric trichlorolevulinate product may be used at 2 parts per million in controlling green algae in a water system by addition of this composition in an appropriate quantity.

Example 9.—Fungicide 3-chlorolevulinic acid may be combined with calcium hydroxide in water to form the calcium salt. The water may be removed under vacuum to isolate this product. This material, an oily liquid, when applied once daily to the skin of the guinea pig infected with *Tinea pedis* will control the infection within four days.

Example 10.—Slimicide

A groundwood pulp slurry of 1% consistency as in Example 7 was treated as in Example 7 with 200 p.p.m. of a mixture of 3,3,5,5-tetrachlorolevulinic acid (7%) and 3,3,5-trichlorolevulinic acid (93%). This treatment, after 24-hour contact at 20° C. effected a total kill of slime organisms.

Thus it is apparent that by the present invention, I have provided a versatile biocidal agent which is highly effective against a wide spectrum of fungi, bacteria, yeasts, and algae and accordingly is widely useful in such important commercial applications as household and industrial disinfection, wood preservation, soil fumigation, rot-proofing of cloth and prevention of slime in papermaking pulp slurries. In addition, the biocides of the invention are of relatively low cost, highly effective at low concentrations and convenient to use.

Having thus described my invention in preferred embodiments, I claim as new and desire to protect by Letters Patent:

1. The method of controlling microbiological organisms which comprises applying to the situs of such organisms an effective concentration of at least one levulinic acid compound selected from the group consisting of
   (a) halogenated levulinic acid having the formula:

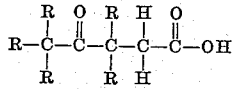

wherein R is selected from the group consisting of hydrogen, chlorine and bromine and wherein at least one occurrence and up to four occurrences of R is selected from the group consisting of bromine and chlorine;
   (b) the alkali metal salt, alkaline earth metal salt, heavy metal salt, primary lower alkylamine salt and secondary lower alkylamine salt thereof;
   (c) the alkyl ester containing from one to ten carbon atoms and phenyl ester thereof;
   (d) the N methyl, N,N dimethyl, N ethyl and N,N diethyl amide and phenyl amide thereof.

2. The method of controlling microbiological organisms which comprises applying to the situs of such organisms an effective concentration of at least one levulinic acid compound selected from the group consisting of:
   (a) 3-chlorolevulinic acid, 3,5-dichlorolevulinic acid, 3,3,5 - trichlorolevulinic acid, 3,5,5-trichlorolevulinic acid and 3,3,5,5-tetrachlorolevulinic acid;
   (b) the alkali metal salt, alkaline earth metal salt and heavy metal salt thereof; and
   (c) the lower alkyl ester thereof.

3. The method of controlling slime-producing microbiological organisms in paper-making slurries which comprises adding to the slurry an effective concentration of at least one levulinic acid compound selected from the group consisting of:
   (a) halogenated levulinic acid having the formula:

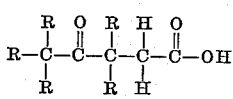

wherein R is selected from the group consisting of hydrogen, chlorine and bromine and wherein at least one occurrence and up to four occurrences of R is selected from the group consisting of bromine and chlorine;
   (b) the alkali metal salt, alkaline earth metal salt, heavy metal salt, primary lower alkylamine salt and secondary lower alkylamine salt thereof;
   (c) the alkyl ester containing from one to ten carbon atoms and phenyl ester thereof;
   (d) the N methyl, N,N dimethyl, N ethyl and N,N diethyl amide and phenyl amide thereof.

4. The method of controlling slime-producing microbiological organisms in paper-making slurries which comprises adding to the slurry an effective concentration of at least one chlorinated levulinic acid compound selected from the group consisting of:
   (a) 3-chlorolevulinic acid, 3,5-dichlorolevulinic acid, 3,3,5-trichlorolevulinic acid, 3,5,5-trichlorolevulinic acid and 3,3,5,5-tetrachlorolevulinic acid;
   (b) the alkali metal salt, alkaline earth metal salt and heavy metal salt thereof; and
   (c) the lower alkyl ester thereof.

5. The method of controlling slime-producing microbiological organisms in paper-making slurries which comprises adding to the slurry a concentration of between about 0.5 p.p.m. to 200 p.p.m. of at least one chlorinated levulinic acid selected from the group consisting of 3-chlorolevulinic acid, 3,5-dichlorolevulinic acid, 3,3,5-trichlorolevulinic acid and 3,5,5-trichlorolevulinic acid.

6. The method as in claim 5 and wherein the chlorinated levulinic acid is added to the slurry in the form of a primary lower alkyl alcohol.

7. The method as in claim 5 and wherein the chlorinated levulinic acid is 3,3,5-trichlorolevulinic acid.

8. The method of preserving wood which comprises applying to the wood an effective concentration of at least one levulinic acid compound selected from the group consisting of:
   (a) halogenated levulinic acid having the formula:

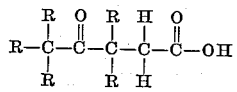

wherein R is selected from the group consisting of hydrogen, chlorine and bromine and wherein at least one occurrence and up to four occurrences of R is selected from the group consisting of bromine and chlorine;
   (b) the alkali metal salt, alkaline earth metal salt, heavy metal salt, primary lower alkylamine salt and secondary lower alkylamine salt thereof;
   (c) the alkyl ester containing from one to ten carbon atoms and phenyl ester thereof;
   (d) the N methyl, N,N dimethyl, N ethyl and N,N diethyl amide and phenyl amides thereof, 9. The method of controlling soil microorganisms which comprises applying thereto an effective concentration of at least one levulinic acid-compound selected from the group consisting of:
   (a) halogenated levulinic acid having the formula:

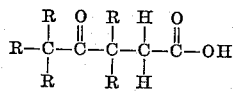

(b) the alkali metal salt, alkaline earth metal salt, heavy metal salt, primary lower alkylamine salt and secondary lower alkylamine salt thereof;
   (c) the alkyl ester containing from one to ten carbon atoms and phenyl ester thereof;
   (d) the N methyl, N,N dimethyl, N ethyl and N,N diethyl amide and phenyl amide thereof.

References Cited by the Examiner

UNITED STATES PATENTS

| | | | |
|---|---|---|---|
| 2,395,446 | 2/1946 | Benson | 71—2.5 |
| 3,148,049 | 9/1964 | Herschler | 71—2.7 |
| 3,151,020 | 9/1964 | Cruickshank | 162—161 |
| 3,160,655 | 12/1964 | Stoffel et al. | 167—22 |

JULIAN S. LEVITT, *Primary Examiner.*

SAM ROSEN, GEORGE A. MENTIS,
*Assistant Examiners.*